Feb. 6, 1968     R. P. WANGER     3,367,605
RADIATION-OPERATED ATTITUDE CONTROL
Filed Sept. 16, 1964     2 Sheets-Sheet 1

INVENTOR.
ROBERT P. WANGER
BY *Henry W. Kaufmann*
AGENT

Feb. 6, 1968 R. P. WANGER 3,367,605
RADIATION-OPERATED ATTITUDE CONTROL
Filed Sept. 16, 1964 2 Sheets-Sheet 2

INVENTOR.
ROBERT P. WANGER
BY Henry W. Kaufmann
AGENT

United States Patent Office 3,367,605
Patented Feb. 6, 1968

3,367,605
RADIATION-OPERATED ATTITUDE CONTROL
Robert P. Wanger, Valley Forge, Pa., assignor to General Electric Company, a corporation of New York
Filed Sept. 16, 1964, Ser. No. 396,930
5 Claims. (Cl. 244—1)

This invention pertains to the control of the attitude of an object in orbit in space as a satellite of a parent body, and more particularly to the use of the magnetic field of the parent body for such control.

It is known to control the attitude of a satellite of the earth by the use of the gradient of gravity, which will cause the axis around which the moment of inertia of the satellite is least to point at the center of mass of the parent. Such stabilization of the satellite with respect to the local verical does not necessarily prevent rotation around the local vertical, i.e., yawing. While it is possible to design a satellite so that the gradient of gravity will produce torques tending to prevent yawing, such design imposes additional limitations on the designer; one obvious requirement is that the satellite may not possess perfect circular symmetry with respect to its local vertical or yaw axis. To the extent that the satellite design approaches such symmetry, yaw stabilization will be impaired. Even in those instances in which active means, such as fluid jets or momentum-storing flywheels are employed for roll and pitch stabilization, a simple and thus light and reliable means of yaw stabilization is desirable. Roll and pitch error are easily determined, inter alia, by horizon sensing; but this is of no avail for measuring yaw error; therefore, a simple yaw control is a very useful complement even to complex systems. An alternative means of yaw stabilization is, therefore, generally desirable.

For a satellite of the earth (or any other parent body having an appreciable external magnetic field) it is possible to provide orienting torques by producing in the satellite magnetic fields which interact with the terrestrial field. This has been done in the prior art, by the use of command signals from a ground station to cause current to flow in predetermined direction in coiled conductors, the general current supply provided in the satellite for other apparatus being also employed for this purpose. However, the prior art stratagem necessitates the use of a command communication channel, the determination from earth of the attitude of the satellite, and determination from the known direction of the earth's field of the particular coil and current direction therethrough to be employed. It would be desirable to provide some automatic means to maintain the satellite in a desired orientation. Unfortunately, the earth's magnetic poles are not coincident with its rotational poles; the north magnetic pole is located at about 73° 31′ North 96° 43′ West, and the south magnetic pole is located at about 72° 21′ South 155° 16′ East. Thus the earth's magnetic poles are not even true antipodes; and the relation to the rotational poles is only casual and approximate. Any automatic means for orientation control by the earth's magnetic field must take account of these facts. It is not obvious how this may be done by any means simple enough to be advantageous.

I have invented a device which employs the sun's radiation as a source of energy and as a spatial reference to produce automatically, in a satellite, magnetic fields appropriate, in the satellite's given location with respect to the earth, to maintain the satellite in a fixed attitude with respect to its yaw axis. The device comprises solar energy converters, which in the present state of art are preferably photovoltaic batteries, connected to coils to produce magnetic fields; and radiation control means (which in my preferred embodiment are simply shades) to permit solar radiation to excite only those solar batteries appropriate for maintaining the desired yaw orientation. While such a device is active as distinct from a purely passive radiation-pressure paddle, it operates without mechanically moving parts. Conductors and magnetic materials have substantially indefinite lives, and the life of photovoltaic cells may be long. Shades or shields are simple mechanical structures no more subject to damage than any other fixed mechanical parts of a satellite. None of these elements is unduly masive, no is their interrelated functioning complex.

There are two different conditions in which it is desirable to interrupt the general manner of functioning of the solar batteries and their associated coils. First, when the satellite passes beneath the sun, since at that time the sun, being at zenith with respect to the satellite, gives no information as to the orientation of the satellite in yaw. Second, when the satellite is in the region of the poles of the earth, since at that time the magnetic field of the earth in the vicinity of the satellite has no readily predictable direction relative to the earth's rotational poles; for example, in the region between the true north pole and the magnetic north pole a magnetic compass will point south rather than north. I, therefore, provide radiation shields which simply prevent the solar batteries from receiving solar radiation at these times, so that there is no magnetic field generated by the coils in the satellite, and the satellite simply maintains by its inertia the correct yaw orientation which it acquired by the previous operation of the solar batteries and associated coils.

A further feature of my invention is the incorporation of damping in the system by the incorporation in the circuit with each solar battery and associated coil of a temperature-sensitive resistor having a significantly large time constant. This has the effect that, when a given solar battery is first illuminated, full current flows to its corresponding coil; but as the temperature-sensitive resistor in the circuit becomes warmer from the passage of current through it, its resistance increases and the current to the coil is reduced. This gives the effect of a time (or phase) lead in the system which, according to principles well known in the servo mechanism art, tends to minimize overshooting and oscillation in the system.

Thus I achieve generally the object of providing a simple long-lived device of moderate mass to control automatically the attitude of a satellite with respect to the parent body by reference to a source of radiation, operative by interaction with the local magnetic field. Achieving this object implies various other desirable objects such as economy, reliability, which will be apparent to one skilled in the art.

For the better explanation and understanding of my invention I have provided figures of drawing in which.

Figure 1:
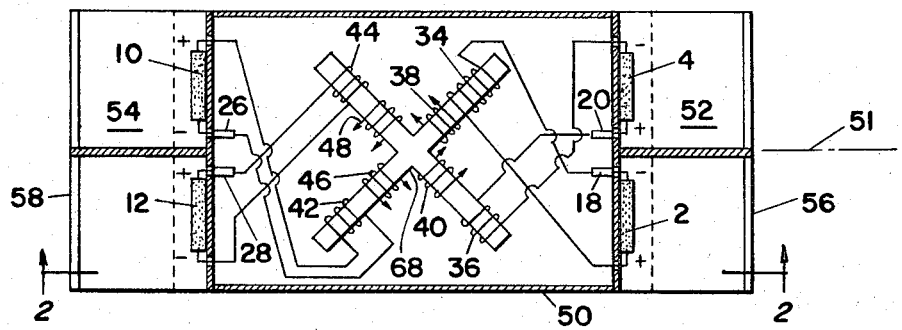
FIGS. 1, 2 and 3 represent schematically in orthographic projection an embodiment of my invention suitable for yaw stabilization of a satellite in a polar orbit whose plane includes the sun.
Figure 2:
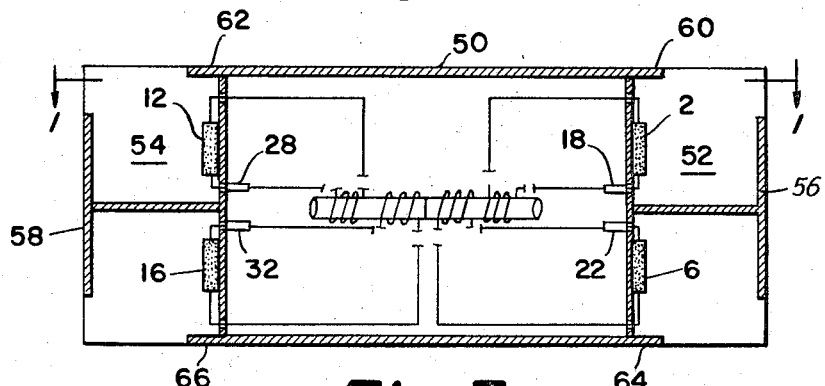
Figure 3:
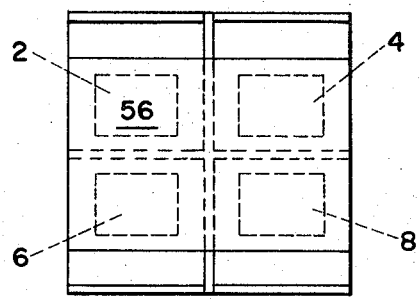

FIGS. 1, 2 and 3 are respectively plan section, elevation section, and profile of the same embodiment of my invention. They will, therefore, be described as a single entity. Eight different solar batteries, numbered evenly from 2 through 16, respectively, as indicated, are connected each in series with one of a plurality of resistors numbered evenly from 18 through 32, respectively, and with one of a plurality of solenoids numbered evenly from 34 through 48, respectively. It will be satisfactory (and, in general, preferable) that all solar batteries be alike, all resistors be alike, and all solenoids be electrically alike. The solar batteries are arranged four at each of two opposite ends of a satellite body generally represented by the reference number 50, having a roll axis 51. At either end of the body 50 there protrudes a cross-shaped structure (52 and 54) which serves to shade from each of the others each of the four solar batteries located at the given end of the body. At the extreme end of the cross-shaped structure 52, there is fastened a polar shade 56, and at the extreme end of the cross-shaped structure 54 there is attached a polar shade 58. The body 50 is provided with equatorial shades 60 and 62 and earth albedo shades 64 and 66. The various solenoids are mounted on the arms of a cross-shaped magnetic core 68, whose details (together with the details of connection of the solenoids to their respective solar batteries) are represented separately in FIG. 5. However, the significance of these details can better be appreciated after a discussion of FIG. 4, which will, therefore, first be given.

Consideration of the structure represented by FIGS. 1, 2 and 3 will reveal that solar batteries 2, 4, 6 and 8 lie each one in a separate cell formed by the cross-shaped shade 52, polar shade 56, and equatorial shade 60 (for batteries 2 and 4) or earth albedo shade 64 (for batteries 6 and 8). Radiation coming from directly below the satellite or directly above it will not strike any of the batteries 2 through 8, and radiation arriving normal to polar shade 56 will strike only a small part of the surface of batteries 2 through 8. However, radiation arriving diagonally in the plane of FIG. 2 will, if it comes from the upper right corner quadrant of FIG. 2, illuminate batteries 2 and 4 equally; if it comes from the lower right corner quadrant of FIG. 2, it will illuminate batteries 6 and 8 equally. If such radiation, instead of being in the plane of FIG. 2, arrives at an angle with the plane of the figure, it will illuminate one battery more than any other; for example, radiation arriving from the lower left portion of FIG. 3 and from the lower right portion of FIG. 2 will illuminate battery 6 more than battery 8 or battery 2; it will not illuminate battery 4 at all. Similarly, radiation arriving from various other direcitons may illuminate battery 2, or battery 4, or battery 8 more than any other of the four batteries 2, 4, 6 and 8 at the right side of FIG. 2. Similarly, radiation arriving obliquely from the left of FIG. 2 can preferentially illuminate one of the batteries 10, 12, 14 and 16 located at the other end of the satellite.

Figure 4:
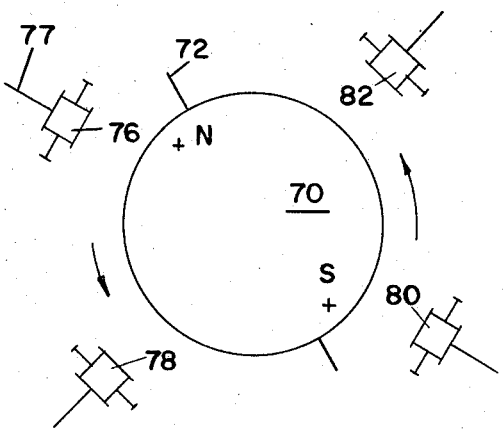
FIG. 4 represents schematically the embodiment of FIG. 1 in various positions in the orbit.

FIG. 4 represents the earth 70, with its axis represented by a line 72 and its north and south magnetic poles represented approximately by letters N and S, respectively. The distant sun 74 is represented as much smaller than the earth 70, to indicate its extreme distance. Satellites like the one represented by FIGS. 1, 2 and 3 are shown in various positions in a polar orbit, as 76, 78, 80 and 82, the direction of the orbit being represented by curved arrows. For completeness, a gravity-gradient stabilization rod is represented as extending from the top of each such satellite, extending away from the earth. It may be seen by inspection that in satellite 76, the sun 74 will illuminate batteries 2 and 4. Similarly, in satellite 78, batteries 10 and 12 will be illuminated. By the time a satellite has moved to the position of 80, batteries 14 and 16 will be illuminated; and when the satellite emerges from the shadow of the earth, as 82 has done, batteries 6 and 8 will be illuminated. If such a satellite yaws in its orbit, so that the solar radiation arrives in a fashion corresponding to radiation arriving out of the plane of FIG. 2 (as has been discussed), one of the pairs of illuminated batteries will be illuminated more than the other, with a result to be discussed in connection with FIG. 5.

It may be seen that the earth albedo shades 64 and 66 will protect the batteries from receiving any radiation, direct or reflected, from the earth at nadir. When the satellite passes directly under the sun 74, in moving from the position of satellite 76 to that of satellite 78, the equatorial shades 60 and 62 will prevent the batteries from receiving any radiation from the sun at zenith.

Somewhat similarly, when the satellite passes over the polar regions, the polar shade 56 or 58 will protect the solar batteries from receiving effective amounts of radiation from the sun 74. This is desirable because the direction of the earth's magnetic field in these regions is somewhat anomalous, as was pointed out earlier in this specification.

Figure 5:
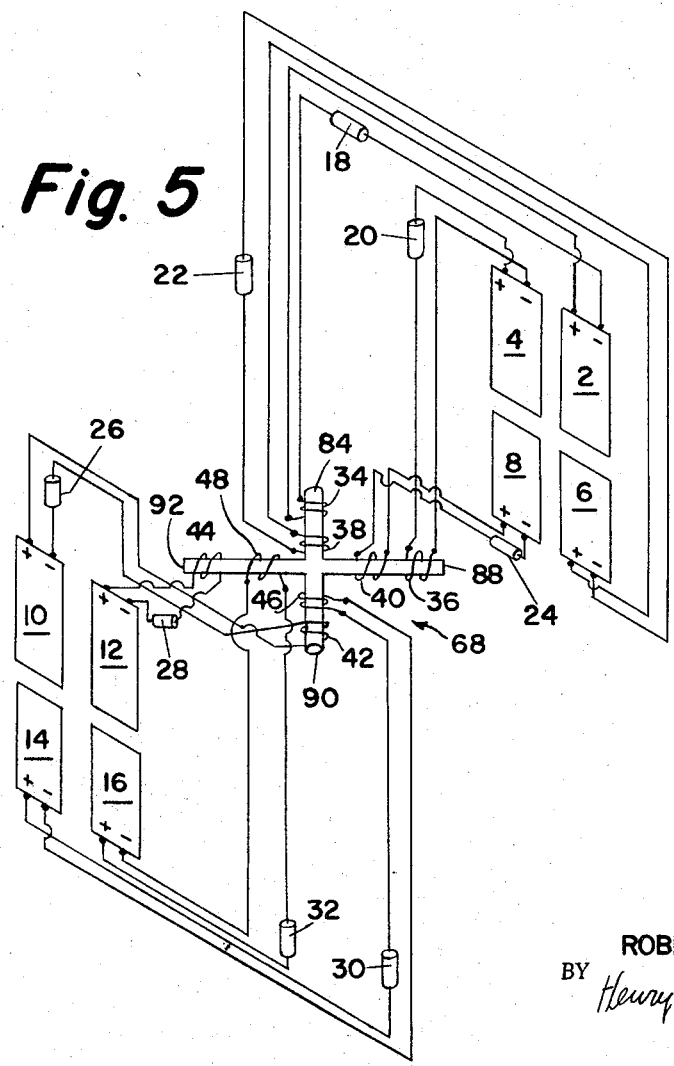
FIG. 5 represents the detailed connections among solar batteries and magnetic coils represented in FIGS. 1, 2 and 3.

FIG. 5 represents in isometric projection solar batteries 2, 4, 6 and 8 and 10, 12, 14 and 16 in their relative positions as they are shown in FIGS. 1, 2 and 3, but without any mechanical structure, in order that their connections may be shown more clearly. The magnetic core 68 is represented with solenoids 34, 36, 38, 40, 42, 44, 46 and 48 on its four arms; and the connection of each solenoid to its corresponding solar battery is shown. The four separate arms of the core have been individually identified by the numbers 84, 88, 90 and 92 to assist in clarifying the explanation. These four arms, as indicated in FIG. 1, are at right angles to each other and at angles of forty-five degrees with the fore-and-aft or roll axis of the satellite. Solar battery 2 is connected via resistor 18 to solenoid 34 in such polarity that, when it delivers current to the solenoid, it magnetizes arm 84 in such a direction that the free end of arm 84 becomes a magnetic south pole. Solar battery 4 is connected via resistor 20 to solenoid 36, so poled that when the solar battery 4 delivers current, the free end of arm 88 becomes a south pole. If batteries 2 and 4 are both equally illuminated, and consequently provide equal currents to their respective solenoids, the south pole strength at the ends of arms 84 and 88 will be equal, and the satellite will tend to be so oriented in the earth's magnetic field that the end of the satellite carrying batteries 2 and 4 will be turned toward the earth's south magnetic pole. Such a situation obtains for satellite 76. If, for some reason, the satellite 76 should yaw so that, for example, battery 2 pointed more directly at the sun 74, battery 4 being consequently shaded from the sun 74 by the shade 52, the south pole strength at the end of arm 84 will become greater than that at the end of arm 88. The satellite will then tend to turn so that arm 84 moves to point more nearly at the earth's south pole; but such rotation will turn the satellite in such a direction as to equalize the illumination on batteries 2 and 4. Thus the system tends to stabilize a satellite in the position of 76 to align it with the earth's magnetic field. When the satellite moves directly beneath the sun, in a position intermediate between the positions of 76 and 78, the equatorial shades 60 and 62 will shield batteries 2 and 4, and 10 and 12, from the sun. But as the satellite moves further toward the position of 78, the sun will fall upon batteries 10 and 12. Battery 10 is connected through resistor 26 to solenoid 42 in such polarity that its current makes the free end of arm 90 a magnetic north pole; and battery 12 is connected through resistor 28 to solenoid 44 in such polarity as to make the free end of arm 92 a magnetic north pole. In the same manner as described for batteries 2 and 4, and their associated solenoids, the solar radiation falling on batteries 10 and 12 will tend to stabilize a satellite in the position of 78. As the satellite passes over the earth's poles, the polar shade 58 will shade cells 10 and 12, and 14 and 16. This is necessary because the direction of the earth's magnetic field becomes anomalous in this region. When the satellite has moved on to the position of 80, sunlight will fall upon batteries 14 and 16. These batteries are connected to solenoids 46 and 48, respectively, but in such polarity that they tend to make the free ends of arms 90 and 92 into magnetic south poles. Thus the end of the satellite which tended to turn toward the south during illumination of batteries 10 and 12 will now tend to turn toward the north during the illumination of batteries 14 and 16. It is now clear why it is necessary to shade the upper pair of batteries, 10 and 12, from the lower pair of batteries, 14 and 16; this must be done so that the upper pair of batteries and the lower pair of batteries will not be illuminated at the same time.

Similarly, when the satellite has moved into the position of 82, batteries 6 and 8 will be illuminated. They are connected to solenoids 38 and 40 in such polarity as to make the free ends of arms 84 and 88, respectively, to become magnetic north poles and thus keep the end of the satellite bearing cells 2, 4, 6 and 8 heading north.

Since core 68 is required to interact with the ambient magnetic field, it must not form a closed magnetic circuit, either in itself or through proximity to other high-permeability materials. This is best expressed by the old conventional nomenclature which would describe it simply as an open core.

In summary, the shading system permits radiation arriving over different ranges of elevation to reach different pairs of solar batteries; in general, this range is about a quadrant for each pair. Thus each of four pairs of solar batteries may function in turn to maintain the satellite oriented properly around its yaw axis in a polar or approximately polar axis. To prevent undesired illumination of the batteries by reflected light, the surfaces of shades 52 and 54, and 56 and 58 should be coated with a light absorbing material.

Little has been said concerning the purpose of the thermally sensitive resistors 18, 20, etc. A balanced servo system like the one here described has a tendency to overshoot and oscillate. This may be conventionally described by the statement that it has a natural period. This may be eliminated or markedly reduced by causing the restoring force to have a phase lead over the error; that is, the restoring torque produced by the varying magnetization of the various arms of core 68 should be a maximum when the displacement from the null or home position is a maximum, and should decrease before the system has returned to the null position. If the resistors have a high temperature coefficient of resistance, and have such thermal capacity that the time they require to come to near equilibrium when current flows in them is slightly less than the period of oscillation of the satellite around its yaw axis, their cumulative thermal sensitivity will produce the effect of phase lead, thus stabilizing the system against overshoots. To describe the characteristics of the resistors in the conventional terminology of the art, the resistors must be thermally sensitive, with a time constant comparable with but less than the natural period of the system in which they are connected. To describe this action completely nonmathematically, if the satellite has yawed so that (for example) battery 2 is illuminated and battery 4 is dark, current will flow through resistor 18 and solenoid 34, producing a torque which tends to return the satellite to its neutral position. The satellite will begin to return slowly to its proper attitude, with increasing angular velocity. During the time that the satellite is returning, the heating up of resistor 18 from passage of current will cause its resistance to increase, decreasing the flow of current through solenoid 34 even more than the current would be reduced by the gradual reduction of the illumination on battery 2 which occurs from the slow return of the satellite to its neutral position. When the satellite passes through its neutral position (as a result of its angular velocity and its inertia), battery 4 will become illuminated. Now current will flow through cool resistor 20 and solenoid 36, tending to stop the satellite from yawing in the opposite direction. Since resistor 20 is initially cool, the current through it and solenoid 36 will be a maximum for the given amount of illumination on battery 4. Thus, whenever the satellite yaws from its neutral position, there will be applied to it during the first part of the yaw strong torques tending to return it to the neutral position; but those torques will be reduced when the yaw has been checked, so that they do not give the satellite so much angular momentum that it is caused to shoot violently back to its neutral position and overshoot by a large amount back in the other direction. When the satellite, in returning to its neutral position, drifts past the neutral point, it is subjected to strong torques which tend to check it near the neutral point. Thus the oscillations are quickly reduced to a negligible value.

What is claimed is:
1. A space satellite comprising:
a plurality of pairs of solar batteries
radiation control means to permit radiation from any given direction to illuminate effectively not more than one pair of said plurality of pairs of batteries;
an open magnetic core provided with a plurality of windings connected directly to said solar batteries and so arranged that passage of electric current through various windings of the said plurality will polarize the said core in various directions.

2. A space satellite as claimed in claim 1 having further
a plurality of resistors of which
one resistor of said plurality is in series with each said solar battery,
each said resistor has the characteristic of increasing in resistance responsively to the cumulative heating effect of continued passage of electric current therethrough.

3. A space satellite comprising:
a body having a leading end and a trailing end;
a magnetic core having arms nonparallel to each other and to the roll axis of the said vehicle;
two pairs of solar batteries mounted one pair above the other pair at the said leading end, and two pairs of solar batteries mounted one pair above the other pair at the said trailing end;
in each said pair, one said solar battery being connected to a solenoid wound about one said arm of said magnetic core and the other said solar battery of said pair being connected to a solenoid wound about another said arm nonparallel to the first said arm of said magnetic core;
shading means to protect all said solar batteries from illumination from the zenith and from the nadir and to selectively protect one pair of a said two pairs of solar batteries from illumination from a given quadrant of elevation.

4. A space satellite comprising:
two pairs of solar batteries at an end of the satellite, arranged one pair above the other pair;
the first said pair of solar batteries being shaded to receive illumination over a first range of elevation,
the second said pair of solar batteries being shaded to receive illumination over a second range of elevation,
each solar battery of the said first pair being connected to a different one of a first pair of solenoids,
each said solenoid of said first pair being wound around a different arm of a magnetic core,
the polarity of the connection of each said solar battery of the said first pair being such as to magnetize a magnetic core arm in a first direction;
each solar battery of the said second pair being connected to a different one of a second pair of solenoids;
each said solenoid of said second pair being wound around an arm of the said magnetic core around which a solenoid of the said first pair is wound,
the said solenoids of said second pair being wound around different arms of the said magnetic core,
the polarity of the connection of each said solar battery of the said second pair being such as to magnetize a said magnetic core arm in a second direction.

5. In a servo system having a natural period and comprising an error signal generator whose output amplitude is a measure of the magnitude of the error being signalled, and is applied to a correction device to reduce the magnitude of the said error, the improvement comprising a thermally sensitive resistor having a time constant comparable with but less than the said natural period connected between the said error signal generator and the said correction device to receive energy solely from the said error signal generator.

References Cited

UNITED STATES PATENTS

| | | | |
|---|---|---|---|
| 2,377,589 | 6/1945 | Sutcliffe | 244—14 |
| 2,545,343 | 3/1951 | Conviser | 244—77 |
| 2,828,930 | 4/1958 | Herbold | 244—14 |
| 3,061,239 | 10/1962 | Rusk | 244—1 |
| 3,158,337 | 11/1964 | Lannan | 244—1 |
| 3,162,764 | 12/1964 | Haviland | 250—83.3 |
| 3,206,141 | 9/1965 | Vivian et al. | 244—1 |
| 3,228,628 | 1/1966 | Chubb | 244—1 |

FERGUS S. MIDDLETON, *Primary Examiner.*